United States Patent
Yoon et al.

(10) Patent No.: US 9,515,309 B2
(45) Date of Patent: Dec. 6, 2016

(54) CYLINDRICAL SECONDARY BATTERY PACK

(75) Inventors: Seogjin Yoon, Cheongwon-gun (KR); Lae-seo Park, Seoul (KR)

(73) Assignee: LG CHEM, LTD., Seoul (KR)

( * ) Notice: Subject to any disclaimer, the term of this patent is extended or adjusted under 35 U.S.C. 154(b) by 130 days.

(21) Appl. No.: 13/123,265

(22) PCT Filed: Oct. 13, 2009

(86) PCT No.: PCT/KR2009/005875
§ 371 (c)(1),
(2), (4) Date: Jul. 28, 2011

(87) PCT Pub. No.: WO2010/044590
PCT Pub. Date: Apr. 22, 2010

(65) Prior Publication Data
US 2011/0281144 A1    Nov. 17, 2011

(30) Foreign Application Priority Data
Oct. 14, 2008    (KR) .................. 10-2008-0100655

(51) Int. Cl.
*H01M 2/30* (2006.01)
*H01M 2/20* (2006.01)
(Continued)

(52) U.S. Cl.
CPC ............. *H01M 2/30* (2013.01); *H01M 2/0267* (2013.01); *H01M 2/105* (2013.01); *H01M 2/20* (2013.01); *H01M 10/425* (2013.01); *H01M 10/052* (2013.01); *H01M 2200/00* (2013.01)

(58) Field of Classification Search
CPC .......... H01M 2/18; H01M 2/30; H01M 2/06; H01M 2/20; H01M 2/0267; H01M 2/105; H01M 10/052; H01M 10/425; H01M 2200/00
USPC .................... 429/130, 133, 156, 164, 178
See application file for complete search history.

(56) References Cited

U.S. PATENT DOCUMENTS 6,979,502 B1 *  12/2005  Gartstein et al. ............. 429/7
2004/0115519 A1  6/2004  Lee
(Continued)

FOREIGN PATENT DOCUMENTS

CN    1985387 A    6/2007
JP    2008-027889    *    2/2008
(Continued)

OTHER PUBLICATIONS

International Search Report dated Apr. 27, 2010 in International Application No. PCT/KR2009/005875.

*Primary Examiner* — Barbara Gilliam
*Assistant Examiner* — Angela Martin
(74) *Attorney, Agent, or Firm* — Birch, Stewart, Kolasch & Birch, LLP (57) ABSTRACT

Disclosed herein is a secondary battery pack including a cylindrical battery cell having an electrode assembly of a cathode/separator/anode structure mounted in a battery case together with an electrolyte in a sealed state, an insulative mounting member having an opening, through which a cathode terminal of the battery cell is exposed upward, the insulative mounting member being configured to have a structure in which a protection circuit module (PCM) assembly is disposed at the top of the insulative mounting member, the insulative mounting member being mounted to the top of the battery cell, a PCM assembly including a PCM having an external input and output terminal formed at the top thereof and connecting members coupled to the bottom of the PCM, the connecting members being connected to a protection circuit of the PCM, and an insulative cap coupled to the top of the battery cell so that the insulative cap surrounds the PCM assembly in a state in which the external input and output terminal is exposed, wherein the cathode terminal and an anode terminal of the battery cell are electrically connected to external input and output terminals via the connecting members through the PCM in a state in which the insulative mounting member and the PCM assembly are disposed on the battery cell.

15 Claims, 4 Drawing Sheets

(51) Int. Cl.
*H01M 10/052* (2010.01)
*H01M 2/02* (2006.01)
*H01M 2/10* (2006.01)
*H01M 10/42* (2006.01)

(56) References Cited

U.S. PATENT DOCUMENTS

2006/0019531 A1 1/2006 Moon
2007/0154784 A1* 7/2007 Seo ................. H01M 2/0207 429/61
2007/0160878 A1 7/2007 Kim et al.
2007/0188132 A1 8/2007 Kim et al.
2008/0138708 A1* 6/2008 Watanabe et al. ............ 429/220

FOREIGN PATENT DOCUMENTS

| KR | 10-0459496 | * | 12/2004 | ............ H01M 10/44 |
| KR | 10-0459496 B1 | | 12/2004 | |
| KR | 10-0879894 B1 | | 1/2009 | |
| KR | 10-0930473 B1 | | 12/2009 | |
| WO | WO 2007046579 | * | 4/2007 | .............. H01M 2/10 |

* cited by examiner

CYLINDRICAL SECONDARY BATTERY PACK

TECHNICAL FIELD

The present invention relates to a cylindrical secondary battery pack, and, more particularly, to a secondary battery pack including a cylindrical battery cell, an insulative mounting member, a protection circuit module (PCM) assembly having connecting members coupled at the bottom thereof in a specific structure, and an insulative cap, wherein a cathode terminal and an anode terminal of the battery cell are electrically connected to external input and output terminals via the connecting members through a PCM in a state in which the insulative mounting member and the PCM assembly are disposed on the battery cell.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as for the mobile devices.

Depending upon kinds of external devices in which secondary batteries are used, the secondary batteries may be used in the form of a single battery or in the form of a battery pack having a plurality of unit cells electrically connected to one another. For example, small-sized devices, such as mobile phones, can be operated for a predetermined period of time with the power and the capacity of one battery. On the other hand, a battery pack including a plurality of cylindrical batteries connected in parallel and in series to each other needs to be used in laptop computers or small-sized personal computers (PCs), because high power and large capacity are necessary for the laptop computers or the small-sized personal computers. The cylindrical batteries are preferable to prismatic batteries or polymer batteries in the aspects of capacity and power.

Therefore, a battery pack used in laptop computers or small-sized personal computers is configured to have a structure in which a core pack including a plurality of cylindrical batteries connected in parallel or in series to each other is mounted in a pack case in a state in which a protection circuit module (PCM) is connected to the core pack.

Meanwhile, in recent years, semi-middle-sized devices, such as camcorders, navigators and portable media players (PMPs), based on secondary battery packs, have been widely used which require higher power and larger capacity than small-sized devices, such as mobile phones, but lower power and smaller capacity than middle-sized devices, such as laptop computers.

As a power source to provide power and capacity required by such semi-middle-sized devices, a battery pack including a plurality of prismatic or pouch-shaped batteries, which are used in small-sized devices, connected to each other may be considered. In this case, however, energy density may be lowered due to the structure of the prismatic or pouch-shaped batteries.

Therefore, cylindrical batteries may be considered to be used as a power source for semi-middle-sized devices. However, conventional cylindrical batteries are optimized to be suitably used as unit cells of middle-sized devices. For this reason, it is required to greatly modify the structure of the batteries so that the batteries can be used as a power source for semi-middle-sized devices.

Consequently, there is a high necessity for a secondary battery pack based on a cylindrical battery suitable to be used as a power source for such semi-middle-sized devices.

DISCLOSURE

Technical Problem

Therefore, the present invention has been made to solve the above problems, and other technical problems that have yet to be resolved.

Specifically, it is an object of the present invention to provide a secondary battery pack that is capable of supplying power and capacity suitable for semi-middle-sized devices using a conventional cylindrical battery cell.

It is another object of the present invention to provide a secondary battery pack that can be assembled in a simple structure using a cylindrical battery cell.

Technical Solution

In accordance with one aspect of the present invention, the above and other objects can be accomplished by the provision of a secondary battery pack including a cylindrical battery cell having an electrode assembly of a cathode/separator/anode structure mounted in a battery case together with an electrolyte in a sealed state, an insulative mounting member having an opening, through which a cathode terminal of the battery cell is exposed upward, the insulative mounting member being configured to have a structure in which a protection circuit module (PCM) assembly is disposed at the top of the insulative mounting member, the insulative mounting member being mounted to the top of the battery cell, a PCM assembly including a PCM having an external input and output terminal formed at the top thereof and connecting members coupled to the bottom of the PCM, the connecting members being connected to a protection circuit of the PCM, and an insulative cap coupled to the top of the battery cell so that the insulative cap surrounds the PCM assembly in a state in which the external input and output terminal is exposed, wherein the cathode terminal and an anode terminal of the battery cell are electrically connected to external input and output terminals via the connecting members through the PCM in a state in which the insulative mounting member and the PCM assembly are disposed on the battery cell.

That is, the secondary battery pack according to the present invention is characterized in that it is possible to supply power and capacity suitable for semi-middle-sized devices using a conventional cylindrical battery cell without modification thereof, and the secondary battery pack can be easily assembled.

Also, the secondary battery pack according to the present invention is configured in a structure in which the electrode terminals, located at the top and bottom of the battery cell, are electrically connected to external input and output terminals of the battery pack via the connecting members A, B and C through the PCM in a state in which the insulative mounting member and the PCM assembly are disposed on the cylindrical battery cell, thereby securing safety of the secondary battery pack.

The above secondary battery pack is quite different from a secondary battery pack for laptop computers using a plurality of conventional cylindrical cells. That is, the secondary battery pack according to the present invention has a novel structure.

It is required for the battery case of the battery cell to be easily manufactured and to exhibit a mechanical strength greater than a predetermined level. For this reason, the battery case may be a metal container, preferably an aluminum container or a stainless steel container.

As previously described, the connecting members are coupled to the bottom of the PCM. The coupling between the connecting members and the PCM is not particularly restricted so long as the electrical connection between connecting members and the PCM is easily achieved. For example, the connecting members may be coupled to the bottom of the PCM using surface mount technology (SMT), soldering or welding.

For information, SMT is widely used to various surface mount devices (SMDs) to an electrode board, such as a printed circuit board (PCB).

In a preferred example, a cathode terminal as one side external input and output terminal (an external input and output cathode terminal) may be formed at the center of the top of the PCM, and an anode terminal as the other side external input and output terminal (an external input and output anode terminal) may be formed at the bottom of the battery cell by one of the connecting members.

As an illustrative example, a cylindrical battery cell is configured to have a structure in which an insulative film is attached to the outside of a battery case in a state in which a protrusion type cathode terminal is exposed from the top of the battery case and an anode terminal is exposed from the bottom of the battery case. In the above cylindrical battery cell structure, the external input and output cathode terminal is formed at the center of the top of the PCM, disposed at the top of the cathode terminal of the battery cell, and the anode terminal of the battery cell is electrically connected to the external input and output anode terminal via the connecting members through the PCM at a position corresponding to the bottom of the battery cell. Consequently, it is possible to manufacture a secondary battery pack the safety of which is secured during charge and discharge of the battery pack by the PCM using a conventional cylindrical battery cell without modification thereof, as in a battery pack based on a prismatic or pouch-shaped battery cell.

Preferably, a protection circuit component is mounted to the center of the bottom of the PCM. As an illustrative example, the protection circuit component may be an integrated circuit (IC) and field effect transistor (FET) assembly, a one-chip or a chip on board (COB). The height of the PCM may be approximately 1 to 3 mm.

In this case, a contact part A to electrically connect the anode terminal of the battery cell to the protection circuit component, a contact part B to electrically connect the protection circuit component to an external input and output anode terminal and a contact part C to electrically connect the cathode terminal of the battery cell to the protection circuit component may be formed around the center of the bottom of the PCM.

Consequently, the electrode terminals of the battery cell are connected to the contact parts A, B and C, located around the center of the bottom of the PCM, and are electrically connected to the external input and output terminals of the battery pack via the protection circuit component, located at the center of the bottom of the PCM.

The connecting member A may electrically connect the anode terminal of the battery cell, located at the bottom of the battery cell, and the contact part A of the PCM to each other, and the connecting member B may electrically connect the contact part B of the PCM and the external input and output anode terminal, located at the bottom of the battery pack, to each other.

That is, since the cylindrical battery cell is configured so that the anode terminal is located at the bottom of the battery cell, a plurality of connecting members is required to position the external input and output anode terminal at the bottom of the battery pack in a state in which the anode terminal of the battery cell extends through the PCM located at the top of the battery cell. Consequently, the connecting member A electrically connects the anode terminal of the battery cell, located at the bottom of the battery cell, and the contact part A, located around the center of the bottom of the PCM, to each other, and the connecting member B electrically connects the contact part B of the PCM and the external input and output anode terminal, located at the bottom of the battery pack, to each other in a state in which the contact part A and the contact part B are circuit connected to each other in the protection circuit.

In this case, the connecting member A may extend along the outside of the battery cell in the longitudinal direction thereof and may include an upper end bent part connected to the contact part A of the PCM and a lower end bent part connected to the bottom of the battery cell. Consequently, the upper end bent part and the lower end bent part of the connecting member A are bent toward the top and bottom of the battery cell to face the contact part A of the PCM and the anode terminal located at the bottom of the battery cell, respectively.

The connecting member B may extend along the outside of the battery cell in the longitudinal direction thereof and may include an upper end bent part connected to the contact part B of the PCM and a lower end bent part to form the external input and output anode terminal at the bottom of the battery cell in a state in which the lower end bent part is insulated from the bottom of the battery cell.

That is, connecting member B may be easily connected to the contact part B of the PCM by the upper end bent part thereof, and the lower end bent part of the connecting member B may be used as an external input and output terminal of the battery pack. Also, since the lower end bent part of the connecting member B is insulated from the anode terminal located at the bottom of the battery cell, the lower end bent part, i.e. the external input and output anode terminal of the battery pack, is not electrically connected to the anode terminal of the battery cell.

In the above structure, the structure of the lower end bent part of the connecting member B is not particularly restricted so long as the lower end bent part of the connecting member B easily forms the external input and output anode terminal. For example, the lower end bent part of the connecting member B may be configured in a planar circular structure corresponding to the bottom of the cylindrical battery cell.

The secondary battery pack may further include an insulative tape interposed between the lower end bent part of the connecting member A and the lower end bent part of the connecting member B to maintain insulation from each other. According to circumstances, a double-sided adhesive tape may be attached to the top of the connecting member B so that the insulative tape can be easily interposed between the lower end bent part of the connecting member A and the lower end bent part of the connecting member B.

According to circumstances, the connecting member A may be connected to the anode terminal at an arbitrary position of the battery cell in a state in which the connecting member A is insulated from the cathode terminal of the battery cell. For example, in a general cylindrical battery cell, a protrusion type cathode terminal is located at the top of the cylindrical battery cell, a remaining portion of the battery cell forms an anode terminal in a state the remaining portion of the battery cell is insulated from the cathode terminal, and the outside of the battery cell, excluding the protrusion type cathode terminal and the bottom of the battery cell, is surrounded by an insulative sheathing film or tube. Consequently, the connecting member A may be connected so as to correspond to the anode terminal since the position of the anode terminal may be changed depending upon the structure of the sheathing film or the tube. Of course, this modified structure falls into the scope of the present invention.

The connecting member C may electrically connect the cathode terminal of the battery cell and the contact part C of the PCM to each other. That is, the cathode terminal of the battery cell is connected to the contact part C of the PCM via the connecting member C. According to circumstances, the cathode terminal of the battery cell may be directly connected to the contact part C of the PCM without using the connecting member C. It should be noted that this modified structure also falls into the scope of the present invention.

Meanwhile, each of the connecting members may be formed of a metal plate. Preferably, each of the connecting members is formed of a nickel plate. The upper end of the metal plate is attached to the bottom of the PCM in a state in which the upper end of the metal plate is bent, and the lower end of the metal plate is electrically connected to a corresponding one of the electrode terminals of the battery cell or form a corresponding one of the external input and output terminals of the battery pack.

The electrical connection between the electrode terminals of the battery cell and the connecting members is not particularly restricted so long as the electrode terminals of the battery cell and the connecting members can be easily connected to each other. For example, the electrical connection between the electrode terminals of the battery cell and the connecting members may be achieved by welding, such as laser welding or resistance welding.

The coupling of the insulative mounting member to the top of the battery cell may be achieved, for example, by bonding so as to more easily assemble the battery pack and secure more stable coupling between the insulative mounting member and the top of the battery cell.

The insulative cap serves to protect the battery cell against external impact, to secure structural stability of members mounted to the top of the battery cell and to maintain the electrical insulation of the battery cell. In order to improve coupling of the insulative cap to the battery cell, therefore, the insulative cap may extend downward by a predetermined length sufficient for at least a portion of the insulative cap to surround the outside of the top of the battery cell in a state in which the insulative cap is mounted to the battery cell. The downward extending portion of the insulative cap may be coupled to the outside of the top of the battery cell by bonding or mechanical coupling so as to maximize such an effect.

Meanwhile, a sheathing film may be attached to the outside of the battery case of the battery cell and the outsides of the connection members A and B. In this case, it is possible to protect the battery cell and the connection members A and B against external environment and to electrically insulate the battery cell and the connection members A and B from the outside. For example, the sheathing film may be a thermally shrinkable tube, which may be attached to the outside of the battery case and the outsides of the connection members A and B so as to surround the outside of the battery case and the outsides of the connection members A and B.

In the secondary battery pack according to the present invention, any battery cells may be used in various manners irrespective of the kind and shape of the battery cells. A lithium secondary battery is preferably used.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
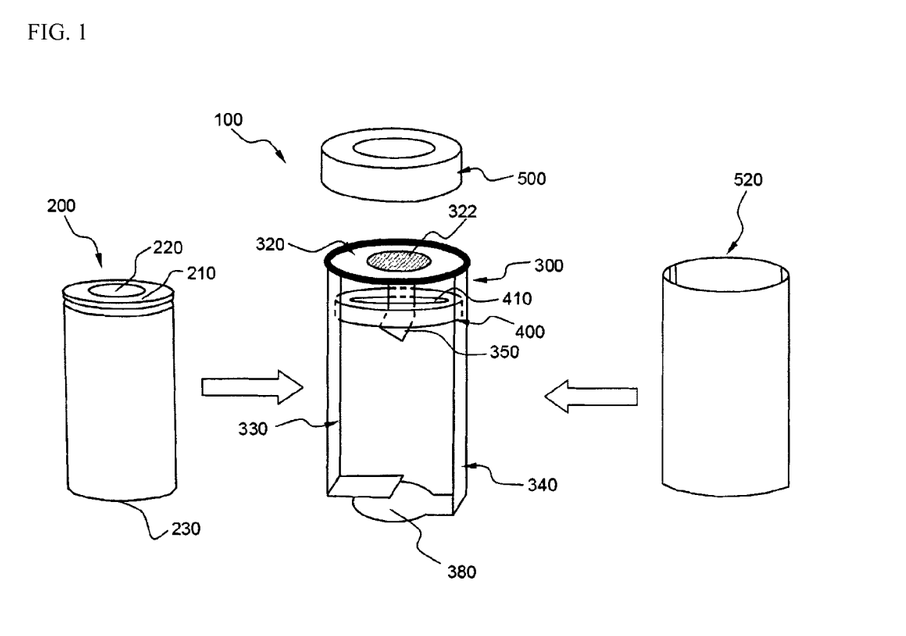
FIG. 1 is an exploded perspective view illustrating a secondary battery pack according to an embodiment of the present invention.

FIG. 1 is an exploded perspective view illustrating a secondary battery pack according to an embodiment of the present invention Referring to FIG. 1, a secondary battery pack 100 includes a cylindrical battery cell 200 having an electrode assembly mounted in a battery case together with an electrolyte in a sealed state, a protection circuit module (PCM) assembly 300 to effectively control an abnormal state, such as overcharge or overdischarge, of the battery cell 200, an insulative mounting member 400 mounted to the top 210 of the battery cell 20 in a state in which the PCM assembly 300 is disposed on the insulative mounting member 400, an insulative cap 500 coupled to the top of the battery cell 200, and a sheathing film 520 attached to the outside of the battery case of the battery cell 200 so as to surround the outside of the battery case of the battery cell 200.

A cathode terminal 220, protruding upward in a state in which the cathode terminal 220 is insulated from the battery case, is formed at the top 210 of the cylindrical battery cell 200. An anode terminal 230 is formed at the bottom of the cylindrical battery cell 200.

The insulative mounting member 400 is coupled to the top 210 of the battery cell 200. An opening 410 is formed at the middle region of the insulative mounting member 400 so that the cathode terminal 220 of the battery cell 200 is exposed upward through the opening 410.

The PCM assembly 300 includes a PCM 320 having an external input and output cathode terminal 322 formed at the top thereof and three connecting members 330, 340 and 350 coupled to the bottom of the PCM 320. The connecting members 330, 340 and 350 are also connected to a protection circuit of the PCM 320.

Also, the insulative cap 500 is coupled to the top of the battery cell 200 so that the insulative cap 500 surrounds the PCM assembly 300. The sheathing film 520 is attached to the outside of the battery case of the battery cell 200, the outside of the connecting member A 330 and the outside of the connecting member B 340 to maintain electrical insulation of the battery cell 200 from the outside and to display product information.

Figure 2:
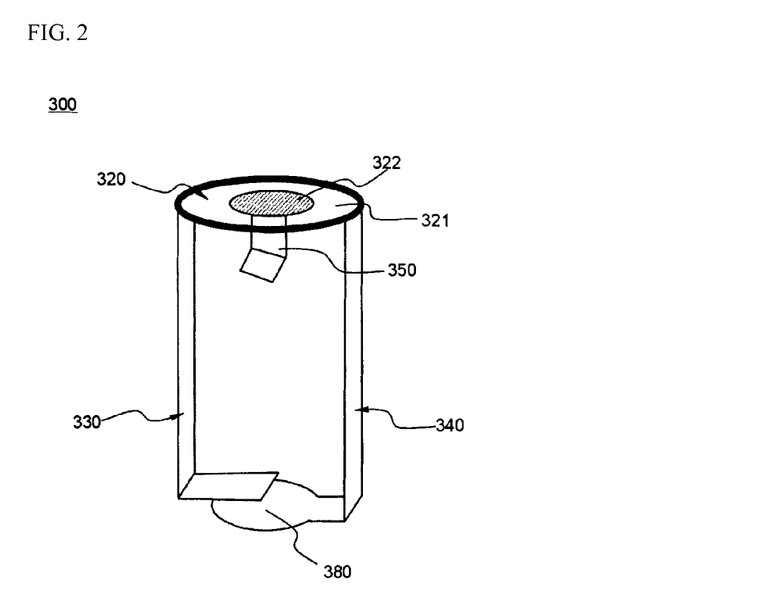
FIG. 2 is a typical view illustrating a protection circuit module (PCM) assembly of FIG. 1.
Figure 3:
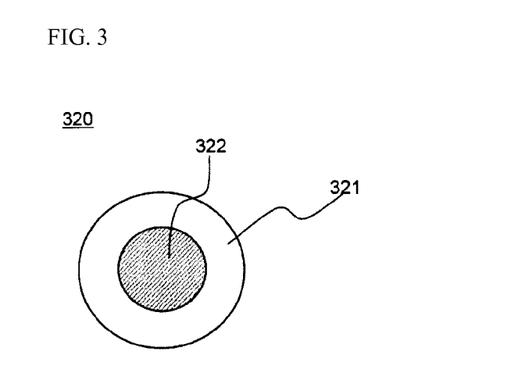
FIGS. 3 and 4 are typical views illustrating the top and bottom of a PCM of the FIG. 2, respectively.
Figure 4:
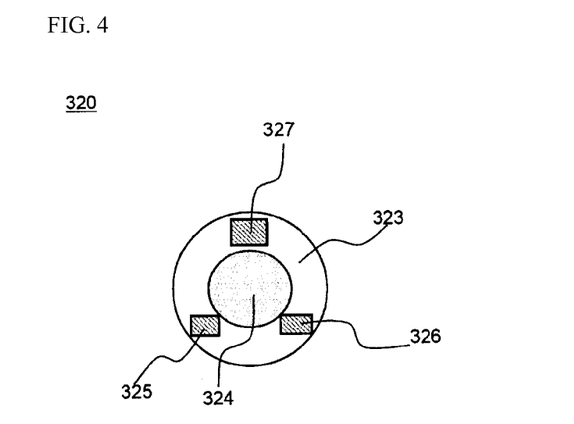

FIG. 2 is a typical view illustrating the PCM assembly of FIG. 1, and FIGS. 3 and 4 are typical views illustrating the top and bottom of the PCM of the FIG. 2, respectively.

Referring to these drawings together with FIG. 1, the external input and output cathode terminal 322 is formed at the center of the top 321 of the PCM 320. An external input and output anode terminal 380 is formed at the bottom of the battery cell 200 by the connecting member B 340.

The connecting member A 330, the connecting member B 340 and the connecting member C 350 are coupled to the bottom of the PCM 320 using surface mount technology (SMT). The connecting members 330, 340 and 350 are nickel plates, which are electrically connected to a protection circuit component 324 of the PCM 320.

The protection circuit component 324 is mounted to the center of the bottom 323 of the PCM 320. Also, a contact part A 325 to electrically connect the anode terminal 230 of the battery cell 200 to the protection circuit component 324, a contact part B 326 to electrically connect the protection circuit component 324 to the external input and output anode terminal 380 and a contact part C 327 to electrically connect the cathode terminal 220 of the battery cell 200 to the protection circuit component 324 are formed around the center of the bottom of the PCM 320 in triangular symmetry.

Figure 5:
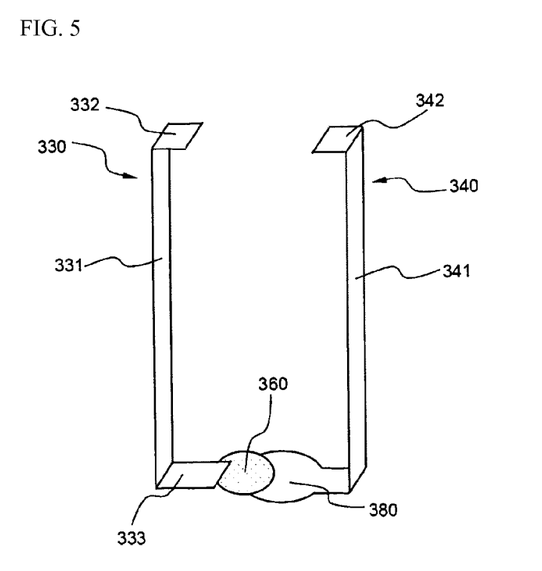
FIG. 5 is a typical view illustrating connecting members A and B of FIG. 2.
Figure 6:
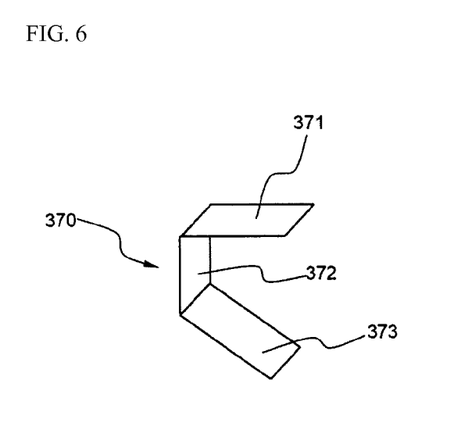
FIG. 6 is a typical view illustrating a connecting member C of FIG. 2.

FIG. 5 is a typical view illustrating the connecting members A and B of FIG. 2, and FIG. 6 is a typical view illustrating the connecting member C of FIG. 2.

Referring to FIG. 5 together with FIGS. 1 and 4, the connecting member A 330 electrically connects the anode terminal 230 of the battery cell 200, located at the bottom of the battery cell 200, and the contact part A 325 of the PCM 320 to each other, and the connecting member B 340 electrically connects the contact part B 326 of the PCM 320 and the external input and output anode terminal 380, located at the bottom of the battery pack, to each other.

The connecting member A 330 includes an extension part 331 extending along the outside of the battery cell 200 in the longitudinal direction thereof, an upper end bent part 332 connected to the contact part A 325 of the PCM 320 and a lower end bent part 333 connected to the bottom 230 of the battery cell 200.

Also, the upper end bent part 332 and the lower end bent part 333 of the connecting member A 330 are electrically connected to the contact part A 325 of the PCM 320 and the anode terminal 230 of the battery cell 200, located at the bottom of the battery cell 200, respectively, by welding.

The connecting member B 340 includes an extension part 341 extending along the outside of the battery cell 200 in the longitudinal direction thereof, an upper end bent part 342 connected to the contact part B 326 of the PCM 320 and a lower end bent part 380 to form the external input and output anode terminal 380 at the bottom of the battery cell 200.

Also, the lower end bent part 380 of the connecting member B 340 is configured in a planar circular structure corresponding to the bottom of the battery cell 200.

Consequently, the upper end bent part 342 of the connecting member B 340 and the contact part B 326 of the PCM 320 are electrically connected to the bottom of the battery cell 200 by welding. The lower end bent part 380 of the connecting member B 340 forms the external input and output anode terminal of the battery pack.

An insulative tape 360 is interposed between the lower end bent part 333 of the connecting member A 330 and the lower end bent part 380 of the connecting member B 340 to maintain insulation from each other.

Referring to FIG. 6 together with FIG. 1, the connecting member C 370 is bent at the top 371 and bottom 373 thereof. The top 371 of the connecting member C 370 is electrically connected to the contact part C 327 of the PCM 320 through the insulative mounting member 400 having the opening 410 in a state in which the bottom 373 of the connecting member C 370 is coupled to the cathode terminal 220 of the battery cell by welding.

Figure 7:
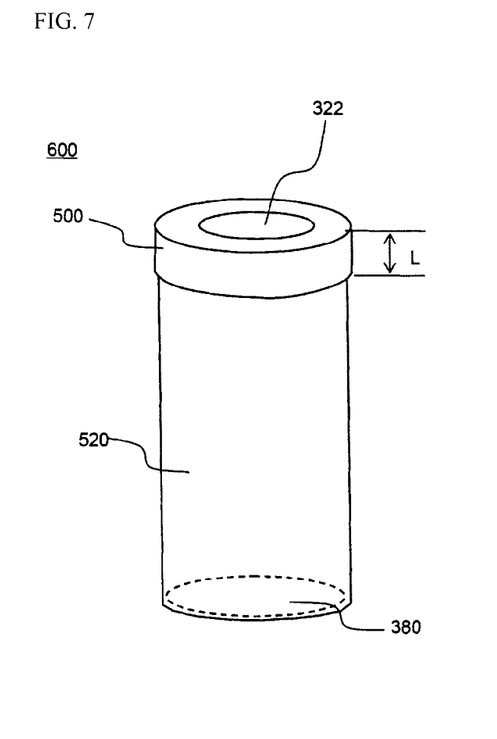
FIG. 7 is a typical view illustrating an assembled state of the secondary battery pack of FIG. 1.

FIG. 7 is a typical view illustrating an assembled state of the secondary battery pack of FIG. 1.

Referring to FIG. 7 together with FIG. 1, the secondary battery pack 100 is configured in a structure in which the insulative cap 500 is coupled to the top of the cylindrical battery cell 200, and the sheathing film 520 is attached to the outside of the battery case of the battery cell 200, the outside of the connecting member A 330 and the outside of the connecting member B 340 to maintain electrical insulation of the battery cell 200 from the outside, as previously described.

The insulative cap 500 extends downward a predetermined length L so as to surround the outside of the top of the battery cell 200. The external input and output cathode terminal 322 of the secondary battery pack 100 is exposed upward.

The sheathing film 520, made of a thermally shrinkable material, is formed in the shape of a tube. The sheathing film 520 is disposed so as to surround the outside of the battery case of the battery cell 200, the outside of the connecting member A 330 and the outside of the connecting member B 340, and then heat is applied to the sheathing film 520 so that the sheathing film 520 shrinks and comes into tight contact with the outside of the battery case of the battery cell 200, the outside of the connecting member A 330 and the outside of the connecting member B 340

Also, the external input and output anode terminal 380 is exposed outward from the bottom of the secondary battery pack 100.

The insulative mounting member 400 and the PCM assembly 300 are disposed at the top of a conventional cylindrical battery cell 200, the sheathing film 520 is disposed at the outsides of the insulative mounting member 400, the PCM assembly 300 and the cylindrical battery cell 200 so as to surround the outsides of the insulative mounting member 400, the PCM assembly 300 and the cylindrical battery cell 200, and the insulative cap 500 is coupled to the top of the battery cell 200, thereby easily manufacturing the secondary battery pack 100 having the external input and output cathode terminal 322 and the external input and output anode terminal 380 formed at the top and bottom thereof.

INDUSTRIAL APPLICABILITY

As is apparent from the above description, the secondary battery pack according to the present invention is configured to have a structure in which the cathode terminal and the anode terminal of the battery cell are electrically connected to the external input and output terminals via the connecting members through the PCM in a state in which the insulative mounting member and the PCM assembly are disposed on the battery cell. Consequently, the secondary battery pack can be assembled in a simple structure while the secondary battery pack provides higher power and larger capacity than a prismatic or pouch-shaped battery pack.

Also, the secondary battery pack configured to have the above structure is preferably used as a power source for semi-middle-sized devices, such as navigators, since the secondary battery pack provides relatively high power and relatively large capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
   one cylindrical battery cell having an electrode assembly of a cathode/separator/anode structure mounted in a battery case together with an electrolyte in a sealed state;
   an insulative mounting member having an opening, through which a cathode terminal of the battery cell is exposed upward, the insulative mounting member being configured to have a structure in which a protection circuit module (PCM) assembly is disposed at the top of the insulative mounting member, the insulative mounting member being mounted to the top of the battery cell;
   a PCM assembly comprising a PCM having an external input and output terminal formed at the top thereof and connecting members coupled to the bottom of the PCM, the connecting members being connected to a protection circuit of the PCM; and
   an insulative cap coupled to the top of the battery cell so that the insulative cap surrounds the PCM assembly in a state in which the external input and output terminal is exposed,
   wherein the cathode terminal and an anode terminal of the battery cell are electrically connected to external input and output terminals via the connecting members through the PCM in a state in which the insulative mounting member and the PCM assembly are disposed on the battery cell,
   wherein a protection circuit component is mounted to the center of the bottom of the PCM,
   wherein a first contact part to electrically connect the anode terminal of the battery cell to the protection circuit component, a second contact part to electrically connect the protection circuit component to an external input and output anode terminal and a third contact part to electrically connect the cathode terminal of the battery cell to the protection circuit component are formed around the center of the bottom of the PCM,
   wherein a first connecting member electrically connects the anode terminal of the battery cell, located at the bottom of the battery cell, and the first contact part of the PCM to each other, and a second connecting member electrically connects the second contact part of the PCM and the external input and output anode terminal, located at the bottom of the battery pack, to each other, and wherein a third connecting member electrically connects the cathode terminal of the battery cell and the third contact part of the PCM to each other,
   wherein a sheathing film is attached to the outside of the battery case of the battery cell and the outsides of the first and second connecting members, and
   wherein the sheathing film is a thermally shrinkable tube, which is attached to the outside of the battery case and the outsides of the first and second connection members so as to surround the outside of the battery case and the outsides of the first and second connection members.

2. The secondary battery pack according to claim 1, wherein the battery case is a metal container.

3. The secondary battery pack according to claim 1, wherein the connecting members are coupled to the bottom of the PCM using surface mount technology (SMT), soldering or welding.

4. The secondary battery pack according to claim 1, wherein an external input and output cathode terminal is formed at the center of the top of the PCM, and an external input and output anode terminal is formed at the bottom of the battery cell by one of the connecting members.

5. The secondary battery pack according to claim 1, wherein the first connecting member extends along the outside of the battery cell in the longitudinal direction thereof and comprises an upper end bent part connected to the first contact part of the PCM and a lower end bent part connected to the bottom of the battery cell.

6. The secondary battery pack according to claim 1, wherein the second connecting member extends along the outside of the battery cell in the longitudinal direction thereof and comprises an upper end bent part connected to the second contact part of the PCM and a lower end bent part to form the external input and output anode terminal at the bottom of the battery cell in a state in which the lower end bent part is insulated from the bottom of the battery cell.

7. The secondary battery pack according to claim 6, wherein the lower end bent part of the second connecting member is configured in a planar circular structure.

8. The secondary battery pack according to claim 1, further comprising an insulative tape interposed between the lower end bent part of the first connecting member and the lower end bent part of the second connecting member to maintain insulation from each other.

9. The secondary battery pack according to claim 1, wherein each of the connecting members is formed of a metal plate.

10. The secondary battery pack according to claim 9, wherein each of the connecting members is formed of a nickel plate.

11. The secondary battery pack according to claim 1, wherein the electrical connection between the electrode terminals of the battery cell and the connecting members is achieved by welding.

12. The secondary battery pack according to claim 1, wherein the coupling of the insulative mounting member to the top of the battery cell is achieved by bonding.

13. The secondary battery pack according to claim 1, wherein the insulative cap extends downward by a predetermined length sufficient for at least a portion of the insulative cap to surround the outside of the top of the battery cell in a state in which the insulative cap is mounted to the battery cell.

14. The secondary battery pack according to claim 1, wherein the battery cell is a lithium secondary battery.

15. The secondary battery pack according to claim 1, wherein the sheathing film has a fixed length.

* * * * *